April 16, 1929.  A. F. BRITTAIN  1,709,655
FRUIT PICKER
Filed May 10, 1924
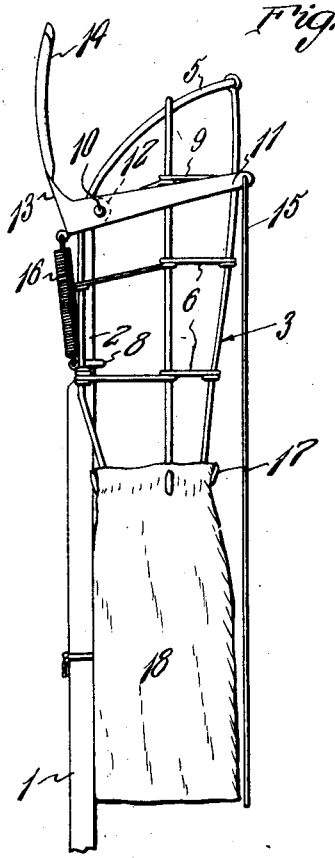
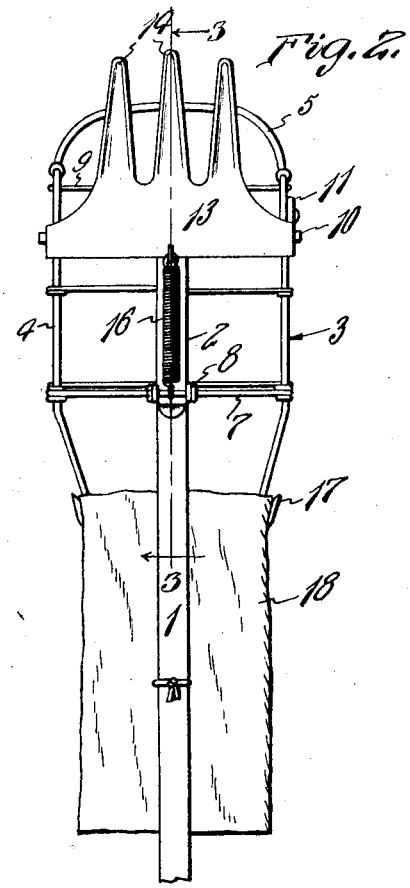
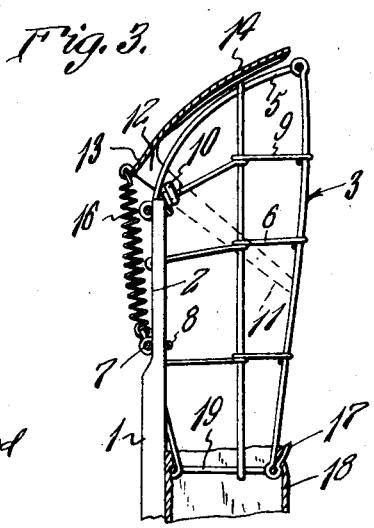
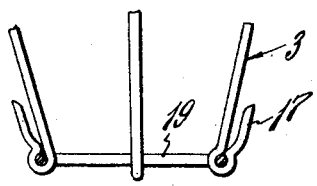
A. F. Brittain
INVENTOR
BY Victor J. Evans
ATTORNEY
WITNESS:

Patented Apr. 16, 1929.

1,709,655

UNITED STATES PATENT OFFICE.

ALEXANDER F. BRITTAIN, OF FEDERALSBURG, MARYLAND.

FRUIT PICKER.

Application filed May 10, 1924. Serial No. 712,389.

My present invention has reference to a fruit picker, and is especially designed, but not necessarily restricted to use, as a picker of citrus fruits.

My object is to produce a device for this purpose characteristic of simplicity in construction, cheapness in manufacture and ease in operation.

With the above recited objects in view and others which will appear as the nature of the invention is better understood, reference is to be had to the drawings which accompany and which form part of this application.

In the drawings:—

Figure 1 is a side elevation of a fruit picker in accordance with this invention.

Figure 2 is a rear elevation thereof.

Figure 3 is a sectional view approximately on the line 3—3 of Figure 2, showing the fingers of the device swung over the fruit receiving and directing cage.

Figure 4 is a view of the improvement with the flexible directing chute removed therefrom and with the ring member holding the hooked lower arms of the cage in proper spaced relation.

The pole is indicated in the drawings by the numeral 1 and is preferably round in cross section. The pole adjacent to its upper end has its outer face reduced and flattened. The upper end of the pole is, for distinction indicated by the numeral 2 and the same has attached thereto a wire cage, broadly indicated by the numeral 3. The cage is constructed to provide a rear flat portion and an outer rounded portion. A strand 5 of suitable wire is centrally arched and extended to provide the parallel rear portions 4 of the cage. Longitudinal strands, parallel with the strands 4, connect the said arched portion 5, while lateral strands 6 are secured to all of the longitudinal strands. The cage is thus provided with an open mouth. The strands 4 are connected by transverse strands 7 which are of a greater gauge than the lateral strands, and short wire members 8 have their ends twisted around the said strands 7, the said short strands being arranged around the pole 5 and hold the strands 7 against the flat face 2 of the pole.

The lateral or body strand 9 nearest the mouth has its ends twisted around the corner strands 4 as well as around the upper lateral strand 7, and the ends of the strands 9 are extended outwardly to provide trunnions 10 which pass through bearing openings in the parallel arms 11 and 12 of a substantially U-shaped plate. The body member of the plate is indicated by the numeral 13, and the same has its upper edge integrally formed with spaced fingers 14. The fingers have their edges bent outwardly to reinforce the same and if desired, the said fingers may be provided with cutting elements.

The arm 11 of the finger carrying plate is of a greater length than the arm 12 and has secured to its outer end a pull cable 15. The body 13 of the finger carrying plate has attached thereto one end of a coiled spring 16, the opposite end being arranged around the lower lateral strand 7, and if desired embedded in the flat face 2 of the pole 1.

All of the longitudinal strands of the cage have their lower ends rounded inwardly and are bent upon themselves to provide hooks 17. These hooks are adapted to be passed through a flexible chute 18 when the picked fruit is to be directed a distance below the cage. When the fruit to be picked is close to the ground, there is arranged around the hooks 17 a ring member 19 which prevents the rounded lower ends of the cage spreading. Either attached to the ring or to certain of the hooks 17 there is a basket or like receptacle for receiving the fruit.

It is believed that the foregoing description, when taken in connection with the drawings, will fully set forth the construction, operation and advantages of my improvement to those skilled in the art to which such inventions relate.

Having described the invention, I claim:—

A fruit picker including a wire cage comprising a strand of wire centrally arched with the ends extended in parallel relation to form the rear strand portion of the cage, longitudinal strands parallel with the first strands, horizontal strands secured to all of the longitudinal strands, the uppermost horizontal strand having its ends twisted around the first strands and extended laterally in opposite directions to form trunnions, a body plate having a lateral short arm and a second arm longer than the first mentioned arm extending therefrom and pivotally mounted upon said trunnions, a pull element attached to the outer end of the long arm, spaced fingers projecting from the plate at substantially right-angles to the said arms, spring means for normally holding the fingers in position away from the cage and the lower extremities of said longitudinal strands being bent upon themselves to form hooks and a ring engaged with the longitudinal strands at the junction of said strands with the hook.

In testimony whereof I affix my signature.

ALEXANDER F. BRITTAIN.